June 13, 1933.  A. L. D. D'ADRIAN  1,913,702
METHOD OF AND MEANS FOR PREVENTING SWEATING OF
GLASS OF REFRIGERATING CASES AND THE LIKE
Filed May 21, 1932
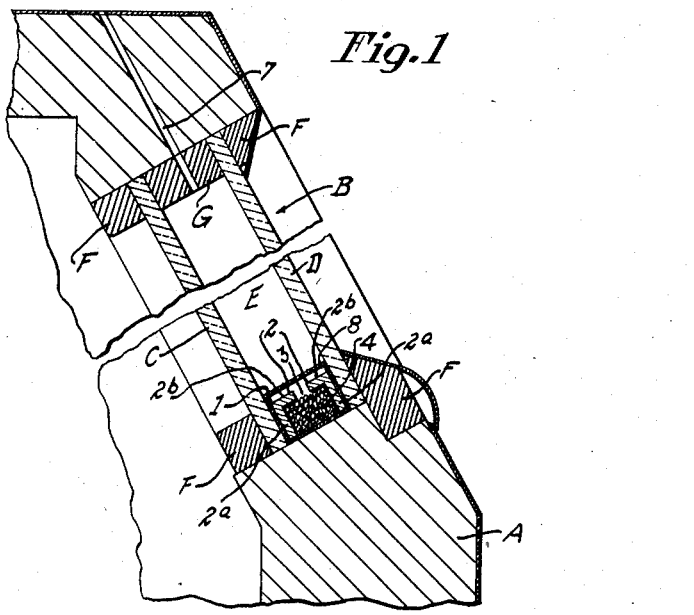
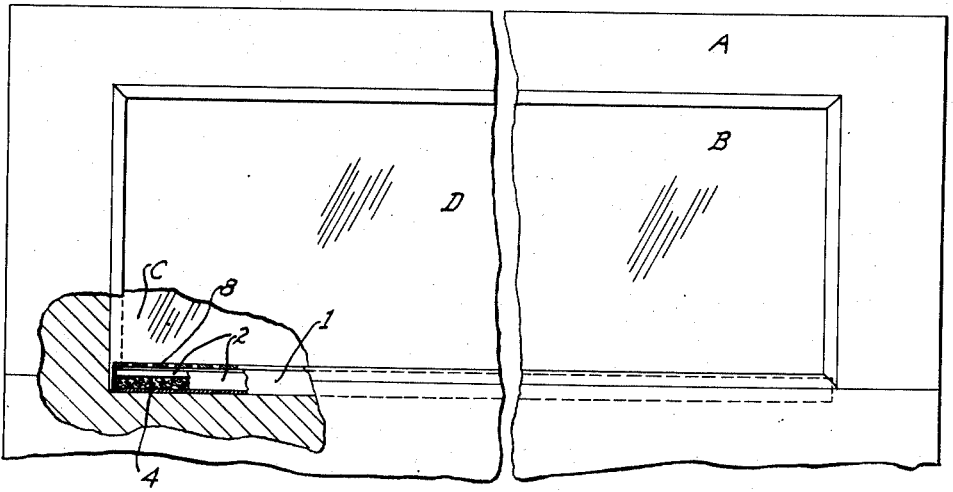
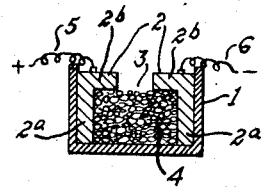
INVENTOR
A. L. DUVAL D'ADRIAN
BY J. S. Cook
ATTORNEY Patented June 13, 1933

1,913,702

UNITED STATES PATENT OFFICE

ALEXANDER L. DUVAL D'ADRIAN, OF ALTON, ILLINOIS, ASSIGNOR TO HUSSMANN-LIGONIER COMPANY, OF ST. LOUIS, MISSOURI, A CORPORATION OF DELAWARE

METHOD OF AND MEANS FOR PREVENTING SWEATING OF GLASS OF REFRIGERATING CASES AND THE LIKE

Application filed May 21, 1932. Serial No. 612,672.

This invention relates generally to a method of and means for preventing sweating of glass in refrigerating cases, and more specifically to an improved method and means which accomplishes the desired result with the aid of a suitable moisture absorbent in the form of a chemical and means for decomposing said moisture into its component parts, hydrogen and oxygen, the predominant object of the invention being to provide an improved method and means of this type which includes a very simple structure for carrying out the improved method in a highly efficient manner.

Sweat (so called) on glass in refrigerating cases is usually caused by humidity contained in the atmosphere between the spaced sections of glass of the case condensing on the glass because of the low temperature of said glass, and to prevent such formation of sweat on the glass I conceived the idea of disposing of the humidity by decomposing it into its component parts, namely, hydrogen and oxygen. To do this I preferably use two or more electrodes in the form of plates which are formed of graphite or other suitable material, and which are arranged in spaced relation in a suitable container formed of electrically non-conductive material. Arranged between the spaced electrodes is a body of suitable hydroscopic material which serves as an absorbing medium for moisture contained in the atmosphere between the sections of glass of the refrigerating case, and in the operation of the invention electric current is caused to pass from one electrode to another through said material. The passage of current through the hydroscopic material decomposes the water therein into its component parts hydrogen and oxygen, neither of which will condense on the glass, and said gases are permitted to escape from the space between the glasses. By continuation of the process accumulation of humidity and the deposition of same on the glass is prevented.

Fig. 1 is a sectional view of a portion of a refrigerating case showing the spaced sections of glass with which the invention is associated.

Fig. 2 is a front elevation of the structure illustrated in Fig. 1.

Fig. 3 is a diagrammatical view showing the electrical connections leading to the electrodes of the invention.

In the drawing wherein is shown for the purpose of illustration, merely, one embodiment of the invention, A designates the front portion of a refrigerating case which is provided with a transparent wall portion B produced by a pair of sections of glass C and D which are spaced apart with respect to each other to provide a space E therebetween. The sections of glass C and D are maintained in the proper positions with respect to the front wall of the case A by suitable elements F, and at their upper ends said sections of glass are maintained in the proper spaced relation by a spacing member G.

Disposed in the lower portion of the space E is an elongated trough-like container 1, which extends longitudinally of the space E from one end thereof to the other. The container 1 is formed of a suitable electrically non-conductive material, hard rubber, bakelite, or celluloid, for instance, and said container is open at the top as shown most clearly in Fig. 1. Arranged within the container 1 is a pair of electrodes 2, which are disposed in spaced relation with respect to each other as shown in Figs. 1 and 3. The electrodes are of inverted, L-shaped formation, said electrodes including portions $2^a$, which are disposed substantially parallel and in substantial contact with the front and rear walls of the container, and portions $2^b$ which are extended toward each other at a substantial right angle with respect to the portions $2^a$. The portions $2^b$ are of such length that a gap 3 is present between the inner ends of said portions $2^b$.

Located within the container 1 and between the electrodes 2 is a body of a suitable hydroscopic material 4. By preference I employ phosphoric anhydride ($P_2O_5$) as the material 4, although other materials, some of which will be hereinafter enumerated, may be employed. Leading to one of the electrodes 2 is an electrical conductor 5 (Fig.

3) which electrically connects said electrode to the positive pole of a suitable supply of electric current, and leading to the other electrode is an electrical conductor 6 which electrically connects said electrode to the negative pole of said electric current supply. The source of electric supply may be the ordinary lighting circuit in the house or building in which the refrigerating case is being used, a resistance element being used when direct current is employed and a transformer and rectifier being used when the current is alternating.

In the use of a refrigerating case equipped with the invention disclosed herein, the absorbent medium 4 absorbs the moisture from the atmosphere between the sections of glass, and after a certain amount of moisture has been absorbed by said absorbent medium phosphoric acid is formed within the container 1. Phosphoric acid is conductive of electric current, and therefore electric current passes from one electrode 2 to another through the matter contained within the container, with the result that the water within the container which was absorbed from the atmosphere is decomposed into its component parts hydrogen and oxygen. The decomposition of water within the container continues until the water content of the matter within the container 1 is reduced to a point where electric current will no longer pass through the container because of the lack of electrical conductivity of said matter. Neither of the gases into which the water in the container is converted will condense on the sections of glass, and therefore the fogging of the sections of glass is entirely eliminated. Preferably I provide a vent opening 7 for the escape of hydrogen and oxygen or air from the space E.

As already stated, various materials other than phosphoric anhydrides may be employed as the moisture absorbent material, among which are calcium chloride, sulphuric acid, or any other compound which is hydroscopic enough to absorb humidity. Also, materials other than graphite may be used in producing the electrodes, as any material which will not be attacked readily by acids may be employed for this purpose.

In order to shield the container 1 and the contents thereof from the view of persons looking through the sections of glass C and D, I preferably provide a perforated plate 8 which is arranged within the space E immediately above said container, as shown in Fig. 1.

While I describe and claim my invention as being particularly applicable to refrigerating units, I do not wish to be limited to this precise use, as said invention may be used with structures other than refrigerating structures. Also, while I refer to the transparent wall portions of the structures with which the invention is used as being glass, the invention will function with equal effectiveness when other transparent materials are used.

I claim:

1. The method of preventing sweating of glass of refrigerating cases which comprises absorbing from the atmosphere adjacent to said glass humidity contained in said atmosphere, and decomposing said humidity into its component parts.

2. The method of preventing sweating of glass of refrigerating cases which comprises absorbing from the atmosphere adjacent to said glass humidity contained in said atmosphere, and decomposing said humidity into its component parts by means of an electric current.

3. The method of preventing sweating of glass of refrigerating cases which comprises absorbing humidity from the atmosphere adjacent to said glass with the aid of a chemical absorbent and decomposing said humidity into its component parts by means of an electric current.

4. The method of preventing sweating of glass of refrigerating cases which comprises absorbing humidity from the atmosphere adjacent to said glass with the aid of a hydroscopic material and decomposing said humidity into its component parts by means of an electric current.

5. The method of preventing sweating of glass of refrigerating cases which comprises absorbing humidity from the atmosphere adjacent to said glass with the aid of phosphoric anhydride ($P_2O_5$) and decomposing said humidity into its component parts by means of an electric current.

6. In combination with a refrigerating case having a transparent wall portion provided by spaced sections of glass, a body of moisture absorbent material in the space between said sections of glass, spaced electrodes so located with respect to said absorbent material that electric current passing from one of said electrodes to another will pass through said absorbent material, and means for electrically connecting said electrodes to a supply of electric energy.

7. In combination with a refrigerating case having a transparent wall portion provided by spaced sections of glass, a container within the space between said sections of glass, moisture absorbent material in said container, spaced electrodes so located with respect to said absorbent material that electric current passing from one electrode to another will pass through said absorbent material, and means for electrically connecting said electrodes to a supply of electric energy.

8. In combination with a refrigerating case having a transparent wall portion provided by spaced sections of glass, a container within the space between said sections of glass, moisture absorbent material in said container, spaced electrodes so located with respect to said absorbent material that electric current passing from one electrode to another will pass through said absorbent material, means for electrically connecting said electrodes to a supply of electric energy, and a discharge passageway for gas within the space between said sections of glass.

In testimony that I claim the foregoing I hereunto affix my signature.

ALEXANDER L. DUVAL d'ADRIAN.